Figure 1:
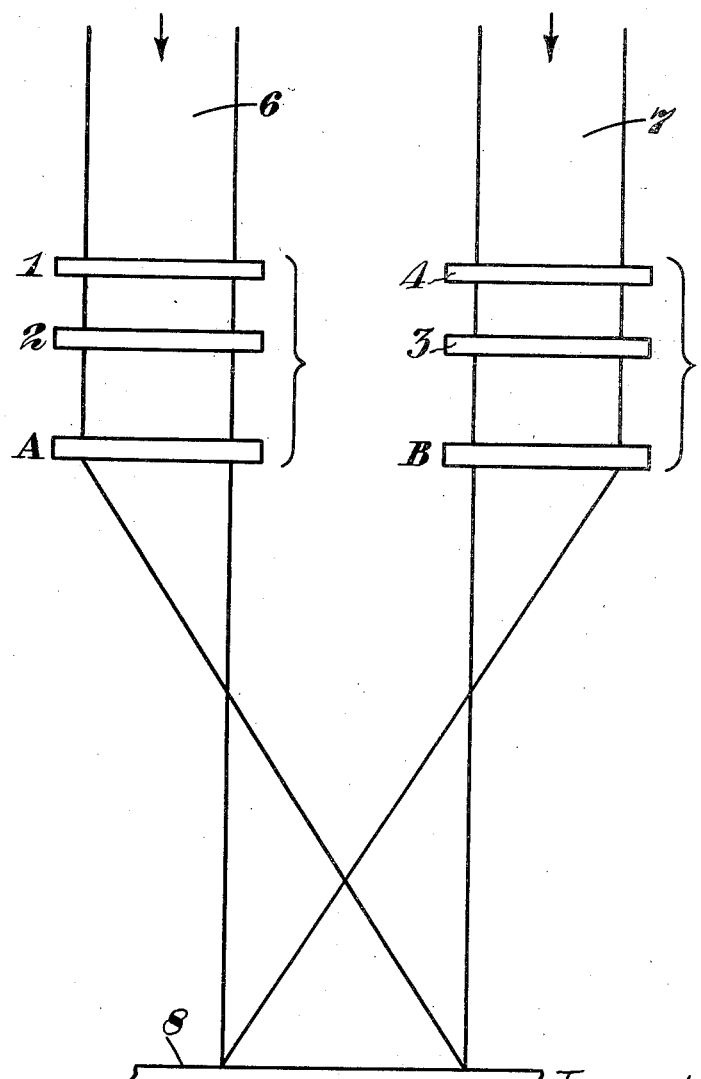

April 16, 1935.　　H. D. MURRAY ET AL　　1,997,648
COLOR CINEMATOGRAPHY
Filed April 20, 1933　　2 Sheets-Sheet 1

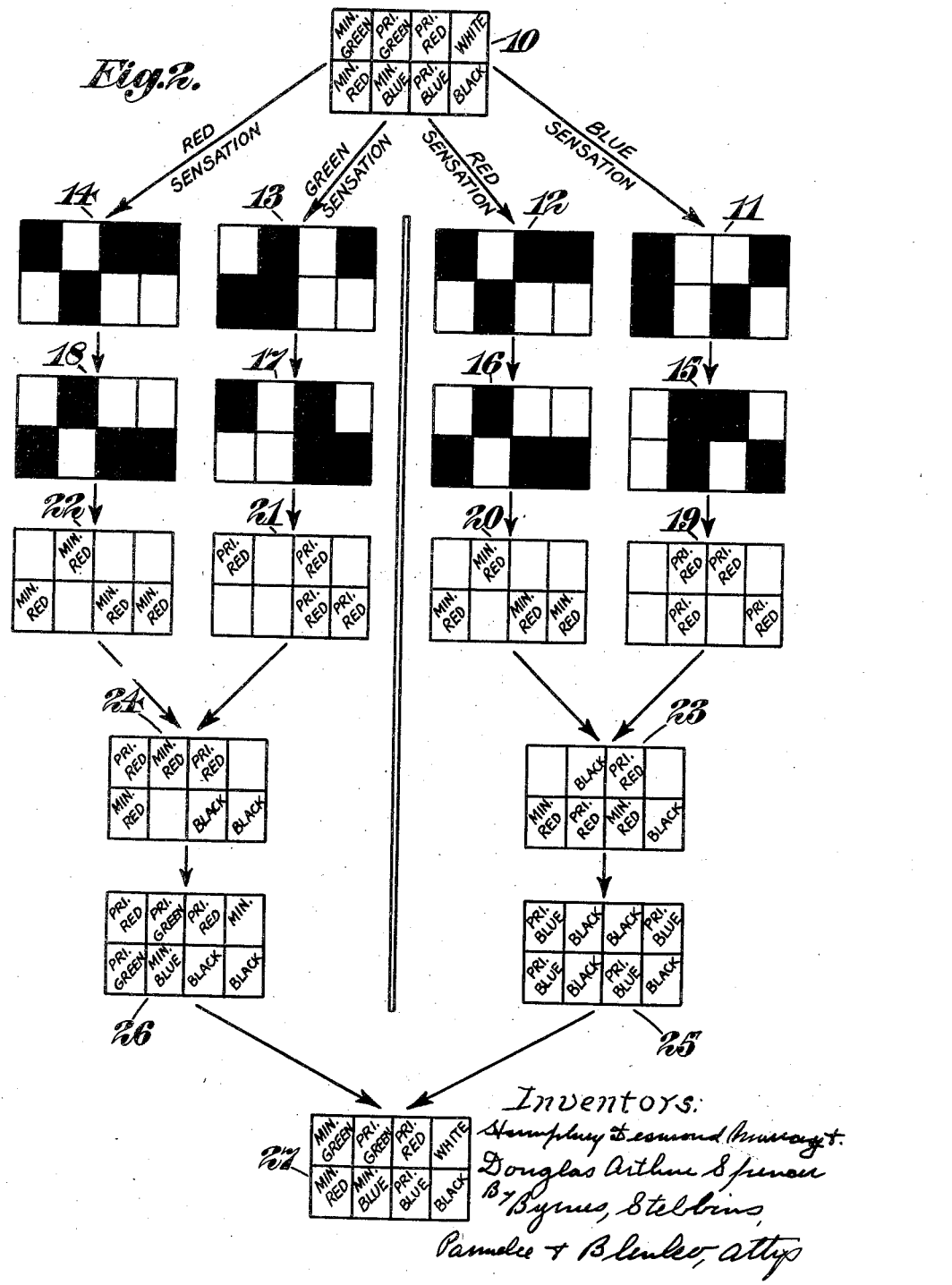

Patented Apr. 16, 1935

1,997,648

UNITED STATES PATENT OFFICE 1,997,648

COLOR CINEMATOGRAPHY

Humphrey Desmond Murray and Douglas Arthur Spencer, London, England

Application April 20, 1933, Serial No. 667,098 In Great Britain April 22, 1932

4 Claims. (Cl. 88—16.4)

This invention comprises improvements in or relating to color cinematography.

The invention is concerned with a process of color cinematography of the type in which, on projection of a film through appropriate filters, the subtractive effect of superimposed colored transparent positive images corresponding to different color selection negatives is combined with the additive synthesis of successive frames of the film to produce a screen picture in colors approximating to those of the original subject. In carrying out a process of this type all the silver or equivalent opaque deposit of each positive image is replaced by a transparent color so that black is produced on the screen, not by absorption of light by the silver or like opaque image, but by the absorption effect of the superimposed transparent colors of which the images are formed combined with the absorption effects of the filters through which the images are projected.

The present invention provides a process of color cinematography of the above type which comprises the steps of taking three color selection images recorded through primary red and primary blue and primary green filters respectively, producing reversed or positive records of such images on double-coated film with two of the color records alternating on one face of the film and the third record continuous on the opposite face, replacing the silver of the positive images by transparent colors selected according to the principles hereinafter specified, and projecting the positive film so that successive frames are projected alternately by light passed respectively through two filters which are additively complementary and which are of such color and so appropriated to the frames of the film that each filter will absorb those rays of light which are transmitted by that primary color, a record of which is absent from the frame.

The projection filters may be constituted by colored stains applied to one or each surface of the film, or alternatively they may be elements separate from the film mounted on a rotatable disc associated with the projector and operable in such manner that successive frames of the film will be projected alternately through the two filter elements.

The replacement of the silver or other opaque deposits formed photographically on the film by a transparent color will hereinafter be referred to as the toning of the image. This may be effected by any known method of color toning or by processes such as that described in British specification No. 377,706.

In the accompanying drawings—

Figure 1 is a diagram showing the general arrangement of the superimposed images and the projection filters, and Figure 2 is a diagrammatic representation of the various steps which are followed in carrying out the invention according to one example, showing the color synthesis which takes place in the production of the finished picture.

The general principles on which this invention is based are as follows. Referring to Figure 1 of the drawings (which is a diagram showing the arrangement of superimposed images and projection filters) it is assumed that there are two projection filters A, B through which successive frames of the film are alternately projected. The superimposed panels of one frame associated with the projection filter A are identified as 1 and 2 and the panels associated with the projection filter B, i. e. the panels on the next adjacent frame, as 3 and 4. Two beams of parallel light 6, 7 are directed through two combinations and the images synthesized additively on the screen 8. The two filters A and B must be of such a color and intensity that they give white light on additive projection. Three sets of projection filters are thus available, viz. minus-blue and primary blue, minus-red and primary red, and minus-green and primary green. Each two successive frames of the film which are to be synthesized additively comprise four panels, two on the front face and two in superimposed relationship on the rear face. Positive images corresponding respectively to three primary color selection negatives are applied to these panels either by superimposing two images on the opposite panels of one frame and applying one only to the next frame, or by providing a duplicate of one of the images and having two superimposed images on each frame.

Assuming that the projection filters employed are (A) minus-blue and (B) primary blue, then the colors in which it is permissible to tone the four images 1-4 are as follows:—

1. Transmitting primary red, or minus-green, which when transmitted through the minus-blue filter gives primary red.

2. Transmitting primary green, or minus-red, which when transmitted through the minus-blue filter gives primary green.

3. Transmitting primary blue or a color such as white (blank), minus-red or minus-green which gives primary blue when transmitted through the primary blue filter.

4. Untoned (black) or toned a color such as minus-blue, primary red, or primary green which gives black when transmitted through a primary blue filter.

It will be seen that there are many different available color combinations for the four toned images, but whatever be the arrangement adopted, the three primary colors red, green and blue, and the three subtractive colors minus-red (or blue-green), minus-green (or magenta) and minus-blue (or yellow) are derived as follows:—

(1+A)+(4+B)=primary red
(2+A)+(4+B)=primary green
(1+2+A)+(3+B)=primary blue
(2+A)+(3+B)=minus-red
(1+A)+B=minus-green
A+(4+B)=minus-blue Where the projection filters employed are (A) minus-red and (B) primary red, the colors in which it is permissible to tone the four images are:—

1. Transmitting primary green or minus-blue.
2. Transmitting primary blue or minus-green.
3. Transmitting primary red or a color which gives primary red when transmitted through a primary red filter.
4. Untoned or toned to a color which gives black when transmitted through a primary red filter.

Where the projection filters employed are (A) minus-green and (B) primary green, the colors in which it is permissible to tone the four image panels are as follows:—

1. Transmitting primary blue or minus-red.
2. Transmitting primary red or minus-blue.
3. Transmitting primary green or a color which gives primary green when transmitted through the primary green filter.
4. Untoned or toned to a color which gives black when transmitted through the primary green filter.

The appropriation of the positive images (in relation to the color selection negative records of which they are prints) to the four panels of the two successive frames is as follows:—

1. Positive image corresponding to negative record taken through filter complementary to the minus color in which it is permissible to tone.
2. Positive image corresponding to negative record taken through filter complementary to the minus color in which it is permissible to tone.
3. Positive image corresponding to negative record taken through the same filter as specified in (1) or (2) above, or through a filter complementary to that used for No. 4.
4. Positive image corresponding to negative record taken through filter of the same color as the projection filter (B).

Processes more or less in accordance with the general principles outlined above have already been proposed and the present invention, while likewise following these principles, has for its object to provide an improved process which can readily be carried out in practice.

The invention is illustrated, by way of example, with reference to Figure 2 which is a diagram in which it is assumed that the object to be photographed is a color chart 10 in which the three primary colors red, blue and green, the three subtractive colors, minus-red, minus-blue and minus-green, and also white and black are represented on adjacent squares. The first step in the process consists in taking three color selection negative records through filters of the three primary colors, namely a blue sensation negative 11, a red sensation negative 12 and a green sensation negative 13, together with a duplicate red sensation negative 14. These separation negatives may be obtained on commercially available bipack cinematograph film by using a beam-splitter cinematograph camera of known type. The record so obtained is contact printed on each side of D. C. stock in a normal photographic manner, the four positive prints 15, 16, 17 and 18 being allocated 15 and 16 to one frame of the film, and 17, and 18 to the next adjacent frame, with the records 15, 17 on one side of the film, and the records 16, 18 on the reverse side. It will be seen, therefore, that what has been produced is a positive film bearing on one side blue and green sensation records alternately, and on the other side a continuous red sensation record. The front of the film (i. e. bearing the records 15, 17) is toned throughout in primary red, the silver of the photographic image being completely replaced by transparent coloring matter. The reverse side of the film (i. e. carrying the images 16, 18) is toned throughout in minus-red. The four toned images thereby produced are identified in Figure 2 as 19—22, corresponding respectively to the silver images 15—18. The composite frames produced by superimposing the images of the two pairs are identified in Figure 2 by the panels 23, 24, the appearance of each panel being indicated. The composite panel 23 is stained primary blue or is projected through the primary blue element of a rotating filter, and the appearance of this composite panel or frame is indicated at 25. The frame 24 comprising the superimposed panels 21 and 22 is stained minus-blue (i. e. yellow) or is projected through the minus-blue element of a rotating filter, and the appearance of this frame on projection is shown at 26. The two images 25, 26 are synthesized additively producing the finished picture 27, which as will be seen, corresponds to the chart 10 constituting the original picture. In the screen picture 27 white is produced by the addition of primary blue and minus-blue light, magenta or minus-green by the addition of primary red and primary blue, minus-red or blue-green by the addition of primary green and primary blue, and so on.

In the above example the colors of the four toned images 19, 20, 21 and 22, correspond to the panels 4, 3, 1, 2 respectively, as identified in Figure 1, and the minus-blue and blue filters by which the final images 26, 25 are produced, correspond respectively to the projection filters A, B identified in Figure 1. It will be seen, therefore, that in this example the relationship between the original sensation records, the colors in which the toned images are rendered, and the colors and appropriation of the projection filters, follows the general rules hereinbefore specified.

The additive synthesis of successive frames of the positive film may be effected by persistence of vision, the film being moved through the projector gate a frame at a time in normal manner. Alternatively, in order to eliminate the disadvantages of high speed of projection and possible eye strain attendant upon the persistence of vision method, an optical device (e. g. twin lenses, biprisms behind a single lens, reflecting mirrors or the like) may be employed for projecting two frames, with an appropriately colored filter associated with each, simultaneously upon the viewing screen, the film being advanced two frames at a time instead of one as in normal projection. If desired, the images instead of occupying each a complete frame, may be reduced in size to such an extent that the two component images (each consisting of a two-color record as previously described) can both be accommodated on one normal cine frame. The two component images may be arranged side by side or one after the other in the length of the film. Various optical devices suitable for producing the additive synthesis of the two portions of each frame are already known.

It is to be understood that the term "successive", as applied to the frames of the film, means frames which, in a persistence of vision method of synthesis, will be projected successively. It is to be understood that such frames need not necessarily occupy successive positions in the length of the film. From the optical point of view it might be found more convenient to put the two pairs of related images (i. e. those which are to be synthesized additively) one frame apart, thus permitting twin lenses to be used for projection. Where therefore the context so permits, the expression "successive" as used in the following claims in connection with the frames of the film, is to be understood as including frames of the film which, whatever be their co-related position on the film itself, are synthesized additively either by projecting them in succession and obtaining the screen picture by persistence of vision, or by combining the images formed by simultaneous projection through the two frames.

We claim:—

1. A process of color cinematography which consists in taking three colour selection negative images recorded through primary red, primary blue and primary green respectively, producing positive records of such images on double-coated film with the blue and green records alternating on one face of the film and the red record continous on the opposite face, replacing the silver of the blue and green images by a transparent primary red colcring matter and the red image by a transparent minus-red matter and projecting the positive film through blue and minus-blue filters alternately with the blue filter appropriated to the superimposed blue-red positive records and the minus-blue to the superimposed green-red records respectively in such manner as to synthesize additively each two successive frames of the film.

2. A process of color cinematography which comprises the steps of taking three color selection images recorded through primary red and primary blue and primary green filters respectively, producing positive records of such images on double-coated film with two of the color records alternating on one face of the film and the third record continuous on the opposite face, replacing the silver of the positive images by transparent colors selected according to the principles herein specified, and projecting the positive film so that successive frames are projected alternately by light passed respectively through two filters which are additively complementary and which are of such color and so appropriated to the frames of the film that each filter will absorb those rays of light which are transmitted by that primary color, a record of which is absent from the frame.

3. A process of color cinematography of the type described, which comprises the combination of the following steps, (a) recording on one side of double-coated film, positive images corresponding alternately to negative selection records of two primary colors selected from red, blue, and green and on the other side images corresponding to a negative selection record of the third unselected primary color, (b) toning all the images on one side of the film throughout in one of said colors and all those on the opposite side thrcughout in the corresponding minus color, and (c) projecting successive frames of the film respectively through two filters one of which is a primary colcr filter, the other a minus color filter and which are additively complementary and are of such color and so appripriated to the frames of the film that each filter will absorb those rays cf light which are transmitted by that primary color, a record of which is absent from the frame.

4. A process of color cinematography which comprises the steps of taking three color selection images recorded through primary red and primary blue and primary green filters respectively, producing positive reccrds of such images on double-coated film with two of the color records alternating on one face of the film and the third record continuous on the opposite face, replacing the silver of the positive images by two transparent colors selected according to one of the principles specified herein in such manner that all the silver on one face of the film is replaced by one color, and all the silver on the other face of the film is replaced by the second color, and projecting the positive film so that successive frames are projected alternately by light passed respectively through two filters whieh are additively complementary and which are of such color and so appropriated to the frames of the film that each filter will absorb those rays of light which are transmitted by that primary color, a record of which is absent from the frame.

HUMPHREY DESMOND MURRAY.
DOUGLAS ARTHUR SPENCER.